US011542966B2

(12) United States Patent
Meier

(10) Patent No.: US 11,542,966 B2
(45) Date of Patent: Jan. 3, 2023

(54) COMPRESSED-AIR SUPPLY SYSTEM FOR OPERATING A PNEUMATIC INSTALLATION, METHOD AND VEHICLE

(71) Applicant: WABCO GmbH, Hannover (DE)

(72) Inventor: Joerg Meier, Hessisch Oldendorf (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 183 days.

(21) Appl. No.: 16/770,951

(22) PCT Filed: Sep. 7, 2018

(86) PCT No.: PCT/EP2018/074183
§ 371 (c)(1),
(2) Date: Jun. 9, 2020

(87) PCT Pub. No.: WO2019/115028
PCT Pub. Date: Jun. 20, 2019

(65) Prior Publication Data
US 2021/0190102 A1  Jun. 24, 2021

(30) Foreign Application Priority Data

Dec. 13, 2017 (DE) ............... 10 2017 011 526.5

(51) Int. Cl.
*F15B 21/048* (2019.01)
*B60G 17/052* (2006.01)
(Continued)

(52) U.S. Cl.
CPC ........ *F15B 21/048* (2013.01); *B60G 17/0523* (2013.01); *B60G 2400/51222* (2013.01);
(Continued)

(58) Field of Classification Search
CPC .............. F15B 21/048; F15B 2211/635; F15B 2211/8855; F15B 2211/50536;
(Continued)

(56) References Cited

U.S. PATENT DOCUMENTS 6,089,831 A * 7/2000 Bruehmann .......... B60T 17/004
417/302
6,332,623 B1 * 12/2001 Behmenburg ..... B60G 17/0408
280/124.16
(Continued)

FOREIGN PATENT DOCUMENTS

DE 3210030 A1 9/1983
DE 3504884 A1 7/1986
(Continued)

*Primary Examiner* — Dustin T Nguyen
(74) *Attorney, Agent, or Firm* — Leydig, Voit & Mayer, Ltd.

(57) ABSTRACT

The invention relates to a compressed-air supply system for operating a pneumatic installation in a pneumatic system of a vehicle, comprising: a compressed-air feed; a compressed-air connection point to the pneumatic installation; a venting connection point to the environment; a pneumatic main line between the compressed-air feed and the compressed-air connection point, which pneumatic main line has an air dryer; a venting valve, which is arranged on the pneumatic main line and is designed as a pilot valve and has a pilot connection point; a compressor having at least one compressor stage; and, in addition to the pneumatic main line, a pilot valve and a pneumatic pilot channel that connects the pilot valve to the pilot connection point of the venting valve. With respect to the compressed-air supply system, according to the invention, a pressure-holding pneumatic reservoir device is connected to the pilot connection point, which reservoir device is designed to provide a control pressure for the pilot connection point, in particular independently of a pressure in the pneumatic main line during venting of the (Continued)

pneumatic system, and the pressure-holding pneumatic reservoir device has at least one separate pilot pressure accumulator, which can be pneumatically connected to the pilot connection point via the control line.

13 Claims, 6 Drawing Sheets

(51) Int. Cl.
B60T 17/00 (2006.01)
B60T 17/06 (2006.01)
(52) U.S. Cl.
CPC ......... B60G 2500/30 (2013.01); B60T 17/004 (2013.01); B60T 17/06 (2013.01); F15B 2211/50536 (2013.01); F15B 2211/528 (2013.01); F15B 2211/625 (2013.01); F15B 2211/635 (2013.01); F15B 2211/8855 (2013.01)
(58) Field of Classification Search
CPC ......... F15B 2211/528; F15B 2211/625; B60G 17/0523; B60G 17/004; B60G 17/06; B60G 2500/30
See application file for complete search history.

(56) References Cited

U.S. PATENT DOCUMENTS

| | | | | |
|---|---|---|---|---|
| 6,726,224 B2* | 4/2004 | Jurr | ................... | B60G 17/0523 280/124.16 |
| 6,752,402 B2* | 6/2004 | Grotendorst | ....... | B60G 17/0521 280/6.16 |
| 6,824,145 B2* | 11/2004 | Behmenburg | ..... | B60G 17/0408 152/416 |
| 7,441,789 B2* | 10/2008 | Geiger | ............... | B60G 17/0523 280/124.16 |
| 7,881,840 B2* | 2/2011 | Rehra | ..................... | F04B 49/08 701/37 |
| 8,220,876 B2* | 7/2012 | Detlefs | ................... | B60T 17/02 303/3 |
| 8,529,660 B2* | 9/2013 | Diekmeyer | ........... | B60T 17/004 96/111 |
| 8,777,246 B2* | 7/2014 | Meier | ................. | B60G 17/0565 280/124.16 |
| 8,876,122 B2* | 11/2014 | Gall | ........................ | B60G 11/27 180/41 |
| 9,199,524 B2* | 12/2015 | Stabenow | .......... | B60G 17/0528 |
| 9,205,719 B2* | 12/2015 | Frank | ................. | B60G 17/0521 |
| 9,273,700 B2* | 3/2016 | Bergemann | ............... | F15B 1/02 |
| 9,694,801 B2* | 7/2017 | Frank | ................. | B60G 17/0523 |
| 10,377,188 B2* | 8/2019 | Couppee | ........... | B60C 23/00363 |
| 2002/0153688 A1* | 10/2002 | Jurr | ..................... | B60G 17/0523 280/124.16 |
| 2009/0079155 A1* | 3/2009 | Rehra | ................... | B60G 17/052 280/124.16 |
| 2013/0195682 A1 | 8/2013 | Becher | | |
| 2013/0255240 A1 | 10/2013 | Bergemann | | |

FOREIGN PATENT DOCUMENTS

| | | |
|---|---|---|
| DE | 3919438 A1 | 12/1990 |
| DE | 19515895 A1 | 10/1996 |
| DE | 10301119 A1 | 7/2004 |
| DE | 10357762 A1 | 2/2005 |
| DE | 102012005345 A1 | 6/2013 |
| DE | 102012001736 A1 | 8/2013 |
| DE | 102012006382 A1 | 10/2013 |
| DE | 102012024757 A1 | 6/2014 |
| EP | 3219522 A1 | 9/2017 |
| WO | WO 01/56820 A1 | 8/2001 |

* cited by examiner

COMPRESSED-AIR SUPPLY SYSTEM FOR OPERATING A PNEUMATIC INSTALLATION, METHOD AND VEHICLE

CROSS REFERENCE TO RELATED APPLICATIONS

This application is a U.S. National Phase Application under 35 U.S.C. § 371 of International Application No. PCT/EP2018/074183, filed on Sep. 7, 2018, and claims benefit to German Patent Application No. DE 10 2017 011 526.5, filed on Dec. 13, 2017. The International Application was published in German on Jun. 20, 2019 as WO 2019/115028 A1 under PCT Article 21(2).

FIELD

The invention relates to a compressed air supply system for operating a pneumatic installation in a pneumatic system of a vehicle, comprising a compressed air supply; a compressed air port to the pneumatic installation; a vent port to the environment; a pneumatic main line arranged between the compressed air supply and the compressed air port and comprising an air dryer; a vent valve which is arranged on the pneumatic main line and is designed as a pilot valve having a pilot control port, a compressor having at least one compressor stage, in addition to the pneumatic main line, a pilot valve and a pneumatic pilot control channel which pneumatically connects the pilot valve to the pilot control port of the vent valve. The invention also concerns a corresponding vehicle and a method.

BACKGROUND

Compressed air supply systems with pilot-controlled vent valves are generally known. This fundamentally advantageous approach is distinguished in that relatively low forces are required to set the vent valve, and hence the actuation forces of the pilot valve may be lower.

DE 103 01 119 A1 discloses an air suspension system with a valve device having a pneumatically actuatable vent valve which can be pilot-controlled by the compressed air of the air suspension system via an electromagnetically actuatable control valve, and which can connect the air spring and/or the compressed air accumulator to atmosphere.

Such a concept however is worthy of improvement, in particular with regard to the possibility of venting to a lower pressure, in particular venting to practically 0 bar. Such a concept is also worthy of improvement with regard to the venting of initially low pressures.

DE 10 2012 001 736 A1 describes a compressed air supply system intended to be connected to the control line of a pressure-holding pneumatic device which is configured to hold the pilot control port under control pressure when the vent valve port of the vent valve in the vent line is open, independently of a pressure in the vent line and/or the pneumatic main line.

WO 01/56820 A1 describes an air suspension system for a motor vehicle with a compressor unit, an accumulator unit and switching valves, via which the individual air springs of the individual vehicle wheels can be supplied with compressed air, wherein a vent line which opens to the atmosphere is arranged in the region between the compressor unit and the switching valves and can be blocked or opened by a shut-off valve.

DE 39 19 438 A1 describes a device which can be actuated by pressurized medium and has an air dryer situated between a pressurized medium source and consumers. Due to the composition of the air dryer, moisture is extracted in so-called regeneration mode only with expanded air, i.e. at a pressure which is substantially lower than that of the air discharged on evacuation of the consumers. The air is expanded using a choke point which is active in the line connection from the consumers to the air dryer during evacuation of the consumers. The new device allows the control or actuation process, performed on evacuation of the consumer, to take place substantially without influence from the choke point and with increased speed of control or actuation.

Despite advantageous pressure-holding pneumatic devices, such concepts are worthy of further improvement in particular with respect to compactness and simple construction. Such concepts are also worthy of improvement with regard to the venting of initially low pressures. Even with sufficiently high pressures, in particular the latter two concepts require a sufficiently high static pressure upstream of the dryer choke in order to guarantee secure opening of the relay piston. This requires large nominal widths of the upstream pneumatic peripherals.

SUMMARY

In an embodiment, the present invention provides a compressed air supply system for operating a pneumatic installation in a pneumatic system of a vehicle. The compressed air supply system includes a compressed air supply, a compressed air port to the pneumatic installation, a vent port to a venting environment, and a pneumatic main line between the compressed air supply and the compressed air port. The pneumatic main line includes an air dryer. The compressed air supply system further includes a vent valve arranged in the pneumatic main line, the vent valve being a first pilot valve with a pilot control port, a compressor having at least one compressor stage, and a second pilot valve and a pneumatic pilot control channel which pneumatically connects the second pilot valve to the pilot control port of the first pilot valve. A pressure-holding pneumatic reservoir device is connected to the pilot control port of the first pilot valve and is configured to provide, during venting of the pneumatic system and independently of a pressure in the pneumatic main line, a control pressure for the pilot control port of the first pilot valve. The pressure-holding pneumatic reservoir device has a pilot pressure accumulator configured to be pneumatically connected to the pilot control port of the first pilot valve via a control line.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

Figure 1:
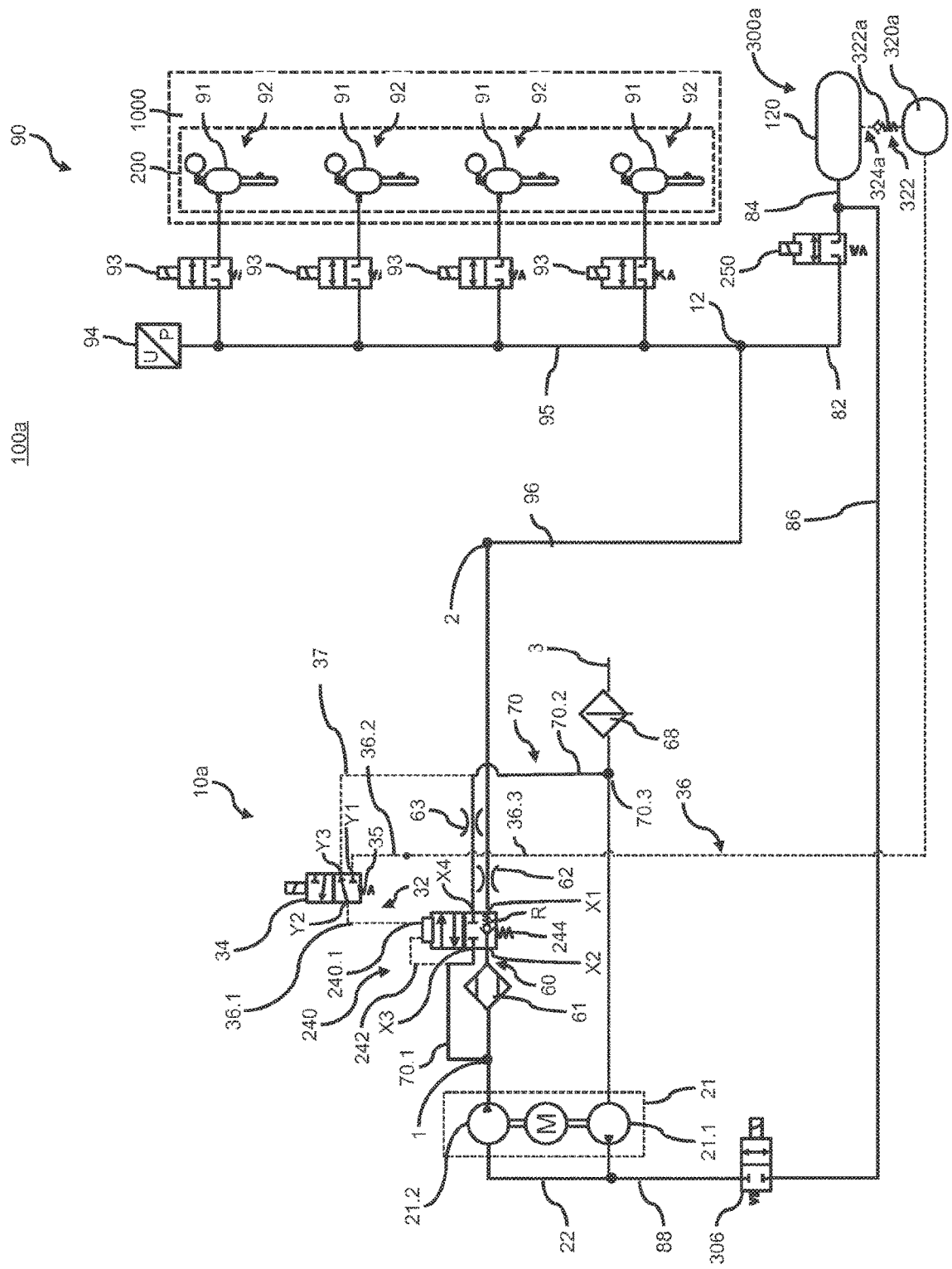
FIG. 1 shows a pneumatic system with a pressure-holding pneumatic reservoir device in a preferred refinement, wherein a pilot pressure accumulator is connected to an accumulator connection on the pressure accumulator.

The present invention describes an improved compressed air supply system. In particular, the present disclosure describes a compressed air supply system in which the pressure can be maintained independently of a pressure in a pneumatic system, in particular a main line.

The invention relates to a compressed air supply system for operating a pneumatic installation in a pneumatic system of a vehicle, comprising a compressed air supply; a compressed air port to the pneumatic installation; a vent port to the environment; a pneumatic main line arranged between the compressed air supply and the compressed air port and comprising an air dryer; a vent valve which is arranged on the pneumatic main line and is designed as a pilot valve having a pilot control port, a compressor having at least one compressor stage, in addition to the pneumatic main line, a pilot valve and a pneumatic pilot control channel which pneumatically connects the pilot valve to the pilot control port of the vent valve.

According to the invention, in the compressed air supply system, it is provided that a pressure-holding pneumatic reservoir device is connected to the pilot control port and is configured to provide a control pressure for the pilot control port, in particular independently of a pressure in the pneumatic main line during venting of the pneumatic system, and the pressure-holding pneumatic reservoir device has at least one separate pilot pressure accumulator, which can be pneumatically connected to the pilot control port via the control line.

A vent valve configured as a pneumatic pilot valve generally has the advantage, e.g. in comparison with a solenoid valve, that it allows switching of large nominal widths of air flows under relatively high pressures, in particular without requiring the high currents required in a solenoid valve.

The invention is based on the consideration that a pressure-holding pneumatic device is in principle advantageous since it advantageously allows pilot control of the vent valve independently of a pressure in the main line. A pressure-holding pneumatic reservoir device in this way allows venting even at low bellows pressures. Furthermore, it is possible to vent the pneumatic system, in particular the pneumatic installation, to relatively low pressures, in particular to a pressure of practically 0 bar.

A pressure-holding pneumatic reservoir device allows venting even with initially low pressures which may e.g. be present in the rear axle springs.

The invention has found that storage and provision of compressed air independently of the pressure in the pneumatic installation, in particular the provision of compressed air in a pressure accumulator, in particular in a pilot pressure accumulator serving for pilot control, is advantageous. Such independence from a pressure in the pneumatic installation makes it possible for example to provide an adequate quantity of sufficiently compressed air for pilot control of the vent valve even when the spring bellows are almost or completely evacuated. Furthermore, the provision of a pressure for pilot control of the vent valve from a pilot pressure accumulator advantageously allows a regeneration choke arranged in the vent line to be provided with a relatively large diameter, in order to allow venting as rapidly as possible taking into account as effective as possible a regeneration of the air dryer on the principle of pressure change adsorption. Effective venting is achieved in particular if the compressed air used for pilot control is now taken from the pressure-holding pneumatic device, in particular a pilot pressure accumulator. Because the control pressure for the vent valve is provided by the pressure-holding pneumatic device, the dryer choke need no longer be designed for sufficient static pressure. Thus advantageously in the choke design, in particular only the regeneration quality and lowering speed need be considered. This furthermore leads to the advantage that if the peripherals upstream of the dryer choke are designed with relatively small flow diameters— and accordingly no static pressure can be created upstream of the dryer choke when the drainage path is open—the relay valve can still be opened safely and completely.

The invention has furthermore found that an arrangement with a pilot pressure accumulator which is connected via an accumulator connection to a pressure source, in particular a main line or a pressure accumulator or a gallery, and with a pressure accumulator check valve arranged in the accumulator connection, is advantageous. The advantage of such an arrangement here lies in particular in that the pilot pressure accumulator is filled autonomously as soon as a pressure prevails in the pressure source. If the pressure in the pressure source however diminishes, the pressure accumulator check valve, which blocks in the direction of the pressure source, i.e. for example in the direction of the main line or pressure accumulator or gallery, prevents the pressure accumulator from emptying. In the same way as an electric capacitor, thus the highest pressure at the pressure source is always stored.

Advantageously, it is provided that the pressure-holding pneumatic reservoir device has a pilot pressure accumulator which can be pneumatically connected to the pilot control port. In concrete terms, this means that, in particular in addition to a primary pressure accumulator already present, an additional pilot pressure accumulator is provided which in particular serves exclusively for loading the pilot control port of the vent valve. In this way, it is advantageously achieved that, independently of a pressure in a pneumatic system, in particular in a pneumatic main line and/or gallery, or independently of a fill level of a primary pressure accumulator which in particular is used in the pneumatic installation, an additional pilot pressure accumulator always has an adequate quantity of sufficiently compressed air available for actuating the vent valve, in particular when the pressure level in the pressure accumulator and/or in the pneumatic main line is no longer sufficient for this.

Advantageously, it is provided that the pilot pressure accumulator can be pneumatically connected to the pneumatic main line via an accumulator connection. This includes in particular that the compressed air which has been compressed in the compressor can flow from the pneumatic main line via the accumulator connection into the pilot pressure accumulator. In this way, as soon as the compressed air is provided, in particular for another purpose such as for example for the pneumatic installation, this enters the pilot pressure accumulator which is thereby filled. Advantageously, this takes place autonomously, in particular without further valve actuation being required.

In particular, it is provided that the pilot pressure accumulator can be pneumatically connected to the pressure accumulator via an accumulator connection. This means in particular that the pilot pressure accumulator can be filled from the pressure accumulator via an accumulator connection. The compressed air which flows into the pressure accumulator to fill this then flows on to the pilot pressure accumulator via the accumulator connection. In this way, with relatively little structural complexity, the pilot pressure accumulator can be filled, advantageously autonomously when filling the pressure accumulator.

Advantageously, it is provided that the pilot pressure accumulator can be pneumatically connected to a gallery via an accumulator connection. In concrete terms, this may mean that the pilot pressure accumulator can be filled via the gallery of the pneumatic system. The pilot pressure accumulator is thus filled when the pressure prevailing in the gallery is higher than the counter-pressure of the pressure accumulator check valve or than the pressure already prevailing in the pilot pressure accumulator. In this refinement, the pressure accumulator check valve also advantageously ensures that the pressure in the pilot pressure accumulator is maintained even if the pressure in the gallery falls in the meantime.

In particular, it is provided that a pressure accumulator valve, in particular a pressure accumulator check valve, which in particular opens against a spring force and blocks in the opposite direction, is arranged in the accumulator connection. The pressure accumulator valve may here be configured as a pneumatically and/or electrically switchable valve, or particularly preferably as a check valve in the form of a pressure accumulator check valve. In particular, this means that air can flow into the pilot pressure accumulator exclusively in the filling direction, and not in the opposite direction. This ensures that the pilot pressure accumulator is automatically filled as soon as sufficient pressure is present at the accumulator connection. At the same time, it is ensured that the compressed air stored in the pilot pressure accumulator cannot escape again through the accumulator connection, and is thus kept available in the pilot pressure accumulator until required to actuate the vent valve. Because of the fact that different pressure levels prevail in a pneumatic system during operation (for example 5 bar in the spring bellows of the rear axle, 10 bar in the spring bellows of the front axle, 18 bar in the pressure accumulator or reservoir), the pilot pressure accumulator holds the last highest pressure present (for example a pressure of 18 bar which prevails on filling of the pressure accumulator). Thus on subsequent venting of the rear axle spring bellows, a pilot pressure of 18 bar is available for opening the relay valve. Because compressed air is stored in the pressure accumulator, with a sufficiently large volume of the pressure accumulator it is also advantageously possible to use the pressure accumulator for multiple actuations of the pilot valve (configured as a relay valve), in particular without refilling the pressure accumulator. Because compressed air is stored in the pressure accumulator, furthermore—because of the relatively high air pressure of for example 18 bar—the relay valve may advantageously be designed smaller.

Advantageously, it is provided that a pressure-holding pneumatic reservoir device is fully or partly integrated in the compressed air supply system, in particular forms a structural unit therewith. In concrete terms, this means that the pressure-holding pneumatic reservoir device is integrated in the compressed air supply, substantially forming one structural unit. The compressed air supply may here be formed as a closed structural unit or as a modular system composed of modules which are linked together to form a compressed air supply, wherein the pressure-holding pneumatic reservoir device forms one module or part of a module. In particular, the compressed air supply system may comprise, in addition to the pressure-holding pneumatic reservoir device, the compressor arrangement, the pneumatic main line, the vent valve, the air dryer and the vent line.

In particular, it is provided that the pressure-holding pneumatic reservoir device is fully or partly integrated in a magnetic valve block. In concrete terms, this means in particular that the magnetic valve block forms a structural unit which amongst others contains the pressure-holding pneumatic reservoir device. Also, similarly to the refinement described above, a modular integration of the pressure-holding pneumatic reservoir device is possible.

By integration of the pressure-holding pneumatic reservoir device, advantages may be achieved in particular with respect to reducing the installation space required, weight saving and cost efficiency of components.

The invention further provides a method for operating a compressed air supply system, wherein the compressed air supply system is used to operate a pneumatic installation in a pneumatic system of a motor vehicle, and has a pressure-holding pneumatic reservoir device with at least one separate pilot pressure accumulator. The method includes compressing the compressed air; supplying the pneumatic system, in particular the pneumatic installation and/or a pressure accumulator and/or a gallery with compressed air; filling the pilot pressure accumulator; operating the pneumatic installation; venting the pneumatic system via a vent valve configured as a pilot valve and having a pilot control port, wherein a pressure-holding pneumatic reservoir device connected to the pilot control port holds the pilot control port under control pressure, in particular independently of a pressure in the pneumatic main line during venting of the pneumatic system; the pilot pressure accumulator is pneumatically connected to the pilot control port via the control line for actuation of the vent valve.

The method according to the invention for operating a compressed air supply system advantageously utilizes the advantages of the compressed air supply system. In particular, venting by means of a vent valve configured as a pilot valve advantageously allows venting to be performed independently of a pressure in the main line, since the pilot control of the vent valve takes place with separately stored compressed air. Thus venting may take place for example independently of a pressure prevailing in the air springs of the pneumatic installation.

In a refinement of the method, it is provided that the pilot pressure accumulator is filled autonomously. In the context of the invention, "autonomously" means that the pilot pressure accumulator is filled as soon as a pressure is present at the pressure source, in particular without further measures being required. The term "pressure source" means in particular the pressure accumulator, main line and/or gallery. According to the concept of the invention, it is thus achieved that the pilot pressure accumulator is always filled immediately when compressed air is present, and furthermore the compressed air is held in the pilot pressure accumulator, in particular by a pressure accumulator check valve.

In a further refinement of the method, it is provided that the pressure-holding pneumatic reservoir device is filled via the main line and/or pressure accumulator and/or gallery.

The invention further provides a vehicle with a compressed air supply system. The concept of the invention is advantageously utilized in the vehicle; in particular, a pressure-holding pneumatic reservoir device according to the concept of the invention allows, as well as the above-mentioned advantages, a faster possible lowering speed of the air springs.

FIG. 1 shows a preferred embodiment of a pneumatic system 100a with a compressed air supply system 10a and an air suspension installation 90 for a vehicle suspension (shown symbolically) of a vehicle 1000 (not shown in detail). The compressed air supply system 10a has a compressed air supply 1, a compressed air port 2 to the air suspension installation 90, and a vent port 3 to the environment. The compressed air supply system 10a furthermore comprises a pneumatic main line 60 between the compressed air supply 1 and the compressed air port 2.

These and the fundamental elements described below for constructing the pneumatic system with the compressed air supply system 10a and the pneumatic installation 90 also apply to the variants of a pneumatic system 100a, 100b, 100c, 100d shown in FIGS. 1 to 4 with corresponding air supply system 10a, 10b, 10c, 10c, 10d. In the description below, for the sake of simplicity, the same reference signs are used for identical or similar features or parts of identical or similar function where suitable and appropriate; however, it must be understood that different variants of components and elements may be used for the pneumatic systems 100a to 100d and the compressed air supply systems 10a to 10d.

The pneumatic main line 60 has an air dryer 61 and a first choke 62. A vent line 70 of the compressed air supply system 10 connects the compressed air supply 1 to the vent port 3 via a vent valve 240 and a second choke 63. A first part 70.1 of the vent line 70 connects the compressed air supply 1 to the vent valve 240. A second part 70.2 of the vent line 70 also connects the vent valve 240 to a connection point 70.3. The connection point 70.3 is in turn connected to the vent port 3 via an air filter 68. A main gallery port 12 of the air suspension system 90 is connected to the compressed air port 2 via a supply line 96.

Furthermore, a pilot control port 240.1 of the vent valve 240 can be selectively pressurized by means of a pilot valve 34, so that the vent valve 240 can be opened and closed pneumatically.

In the present case, the vent valve 240 is preferably designed as a 4/2-way directional valve. In the depiction shown here, the vent valve 240 is shown in a first delivery position. In this delivery position of the vent valve 240, compressed air can flow from a second pneumatic port X2 to a first pneumatic port X1, through a check valve R which opens against the spring force. Thus the compressed air delivered by the compressor 21 flows through the pneumatic main line 60 from the compressed air supply 1 to the compressed air port 2 and on to the pneumatic installation 90. The pneumatic connection between a third pneumatic port X3 and a fourth pneumatic port X4 is interrupted in the delivery position of the vent valve 240, which means that the vent line 70 is interrupted.

The vent valve 240 may in particular be brought from the blocked position shown into a vent position by pneumatic actuation, in particular via a pilot control port 240.1. In this vent position, firstly air can flow from the compressed air port 2 and also from the first pneumatic port X1 to the second pneumatic port X2 through the air dryer 61. Via the compressed air supply 1, the air can then flow further from the compressed air supply 1 and also from the third pneumatic port X3 to the fourth pneumatic port X4 via the vent line 70 to the vent port 3. In this way, for the purpose of regeneration by means of compressed air, air from a pressure accumulator or the pneumatic installation can flow through the air dryer 61 against the usual delivery direction.

The right-hand side of FIG. 1 clearly shows a pneumatic installation 90 in the form of an air suspension system of a vehicle. The air suspension system 90 has a gallery 95 to which a respective spring bellows 91 of an air spring 92 is connected, wherein the connection may be pneumatically interrupted by a respective directional control valve 93 configured as a 2/2-way magnetic valve. A pressure sensor 94 is connected to the gallery 95.

The pressure sensor 94 is here connected to a device 400 (not shown in detail) for control and regulation of the pneumatic system 100, said device furthermore being connected for signal conduction to the valves of the pneumatic system 100, in particular the directional control valves 93, the pilot valve 34, a pressure accumulator valve 250, a charging valve 306. These connections are not shown in the present case for reasons of clarity. Such a device may be formed for example by an electronic control unit (ECU).

Furthermore, the compressed air supply system 10 in the present case comprises a pressure accumulator 120. The pressure accumulator 120 is connected gas-conductively to the main gallery port 12 via a pressure accumulator supply line 82. This connection can be selectively interrupted via the pressure accumulator valve 250.

The compressor arrangement 21 is in the present case driven by a motor M and for compression draws in air via the vent port 3. An air filter 68 is arranged between the compression arrangement 21 and the vent port 3. In the present case, the compressor 21 has a low-pressure stage 21.1 and a high-pressure stage 21.2 which are connected together pneumatically via an intermediate line 22, such that the compressed air drawn in by the vent port 3 and precompressed in the low-pressure stage 21.1 can flow into the high-pressure stage 21.2 where it is compressed further to a high-pressure level, in order then to be supplied to the compressed air supply 1.

Also, a second pilot control port 242 is provided on the vent valve 240, such that the vent valve 240 can be actuated by extraction of the pressure at the pneumatic main line 60.

In the present case, the pneumatic installation 90 has five level control valves which are formed as bellows valves in the form of a directional control valve 93, and as a pressure accumulator valve 250, in the form of a magnetic directional control valve, namely a 2/2-way magnetic directional control valve. The bellows or pressure accumulator valves 93, 250 formed as magnetic directional control valves are connected together via a gallery 95, wherein the gallery 95 is connected to the pneumatic main line 60 via a further supply line 96 at the compressed air port 2.

To operate the pneumatic installation 90, depending on the height level measured, the bellows 91 forming the air springs are filled with compressed air from the compressed air supply system 10 via the compressed air port 2; this serves to raise the level of the superstructure of the vehicle 1000. Conversely, the air bellows 91 can be vented in the opposite direction via the compressed air port 2 leading to a vent port 3, so that the level of the vehicle superstructure 200 is lowered as compressed air escapes from the spring bellows 91. To fill the pneumatic installation 90 via the compressed air port 2, the vent valve 240 is in the delivery position shown, i.e. closed and unpowered or not pressurized. Similarly, the third and fourth pneumatic ports X3, X4 are pneumatically isolated, i.e. the first part 70.1 of the vent line 70 is closed against the second part 70.2 of the vent line 70.

To vent the pneumatic installation 90, the magnetic coil of the pilot valve 34 is suitably energized by means of a current signal conducted via a line (not shown here); consequently, the magnetic coil of the pilot valve 34 is energized and opened against the spring pressure of a control valve spring 35. The control line 36 is thus opened via the pilot valve 34, i.e. the first part 36.1 of the control line 36 is connected to the second part 36.2 of the control line 36 and to the pilot control port 240.1. A control pressure present in the control line 36 is built up at the pilot control port 240.1, and acts against the force of the vent valve spring 244 of the vent valve 240; finally, the third pneumatic port X3 opens to the fourth pneumatic port X4 of the vent valve 242, and hence the vent line 70 and an output of the air dryer 61 to the vent port 3. The first pneumatic port X1 is simultaneously connected to the second pneumatic port X2, so that the blocking effect of the check valve R in the vent valve 240 is eliminated. With the valve ports X3, X4 of the vent valve 240 in the vent line 70 opened in this way, in the present case the pilot control port 240.1 is held under control pressure.

This arrangement of pilot valve 34 with control line 36 to the pilot control port 240.1 of the vent valve 240, pilot pressure accumulator 320a, pressure accumulator check valve 322a, accumulator connection 324a and vent valve 240, is designated below also as the pressure-holding pneumatic reservoir device 300a or, as in the further figures, as the pressure-holding pneumatic reservoir device 300a, 300b, 300c, 300d; the pilot control port 240.1 is held under control pressure by the pressure-holding pneumatic reservoir device 300a, 300b, 300c, 300d, in particular also when the air pressure is falling during the vent process in the main line 60.

In addition, according to the concept of the present invention, in the further embodiments explained it is provided that, with the pneumatic ports X3, X4 of the vent valve 240 in the vent line 70 open, the pilot control port 240.1 is held under control pressure; this is independent of a pressure in the vent line 70 and the pneumatic main line 60. In particular, by means of a pressure-holding pneumatic reservoir device 300a, 300b, 300c, 300d, the control pressure can be maintained although a pressure in the vent line 70 and in the pneumatic main line 60 may fall below a residual holding pressure, i.e. a pressure predefined by the vent valve spring 244 for actuation of the vent valve 240. Thus according to all embodiments explained below, it is guaranteed that the pressure in the vent line 70 and the pneumatic main line 60 can fall practically to ambient pressure, so that the spring bellows 91 can be vented down to ambient pressure.

With reference to FIG. 1, for venting, the coil of the pilot valve 34 configured as a 3/2-way valve is energized and the pilot valve 34 transfers from the unpowered state shown in FIG. 1 into the powered state in which the first pilot valve port Y1 is connected pneumatically to the second pilot valve port Y2; i.e. the first part 36.1 of the control line and the second part 36.2 of the control line 36 to the pilot control port 240.1 are connected together. In contrast, when the pilot valve 34 is not energized, the second pilot valve port Y2 is pneumatically connected to the third pilot valve port Y3, whereby a connection is created between the first part of the control line 36.1 and a control vent line 37 which is also connected to the vent line 70.

The refinement of a pneumatic system 100a shown in FIG. 1 has a pressure-holding pneumatic reservoir device 300a with a pilot pressure accumulator 320a, wherein the pilot pressure accumulator 320a is pneumatically connected to the third part 36.3 of the control line 36. The pilot pressure accumulator 320a is furthermore pneumatically connected to the pressure accumulator 120 via an accumulator connection 324a but—because of a pressure accumulator valve 322 which is arranged in the accumulator connection 324a and in the present case is configured as a pressure accumulator check valve 322a—only in the flow direction from the pressure accumulator 120 to the pilot pressure accumulator 320a. Accordingly, the flow direction from the pilot pressure accumulator 320a to the pressure accumulator 120 is blocked. This advantageously achieves that, on filling of the pressure accumulator 120 by the compressor 21 (or also by the outlet of compressed air from the spring bellows 91), not only does compressed air flow into the pressure accumulator 120 but also via the accumulator connection 324a into the pilot pressure accumulator 320a. In this way, compressed air is stored in the pilot pressure accumulator 320a and is used in particular exclusively to load the control line 36 and hence the vent valve 240. Because of the pilot pressure check valve 322a, the compressed air remains contained in the pilot pressure accumulator 320a even when the pressure accumulator 120 is emptied, for example to supply the pneumatic installation 90. In this refinement, furthermore the return line 86—which in this case is used exclusively to charge the compressor 71—and the control line 36 are completely separated from each other.

Figure 2:
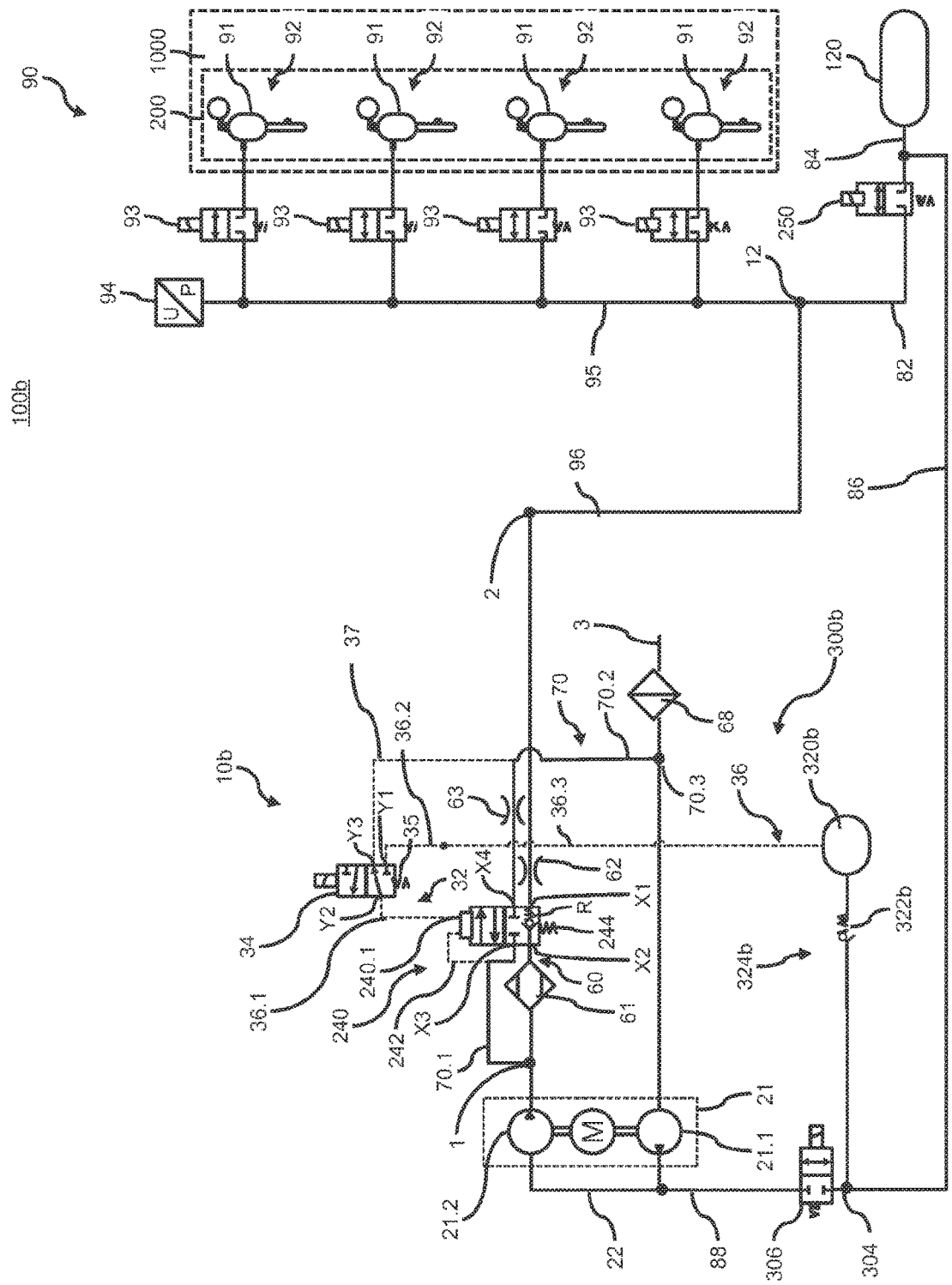
FIG. 2 shows a pneumatic system with a pressure-holding pneumatic reservoir device in a further preferred refinement, wherein a pilot pressure accumulator is connected to an accumulator connection on the return line.

FIG. 2 shows a pneumatic system 100b of a further refinement of the invention. The pneumatic system 100b shown here differs substantially from the refinement shown in FIG. 1 in that a pilot pressure accumulator 320b is arranged between the branch point 304 and the control line 36, in particular in the compressed air supply system 10b, in particular in or on the pilot valve 34 or in or on the air dryer 61. For this, the pilot pressure accumulator 320b is pneumatically connected to the branch point 304 via an accumulator connection 324b. Furthermore, the pilot pressure accumulator 320b is pneumatically connected to the third part 36.3 of the control line 36. In this way, the pilot pressure accumulator 320b can be filled from the pressure accumulator 120 via the return line 86. The return line 86 may also be used to charge the compressor 21. Because of a check valve 322b arranged in the accumulator connection 324b, advantageously—as in the refinement shown in FIG. 1—a compressed air quantity provided for loading the pilot control port 240.1 is held in the pilot pressure accumulator 320b even if the pressure falls again in the return line 86 and/or the pressure accumulator 120 after filling of the pressure accumulator.

Figure 3:
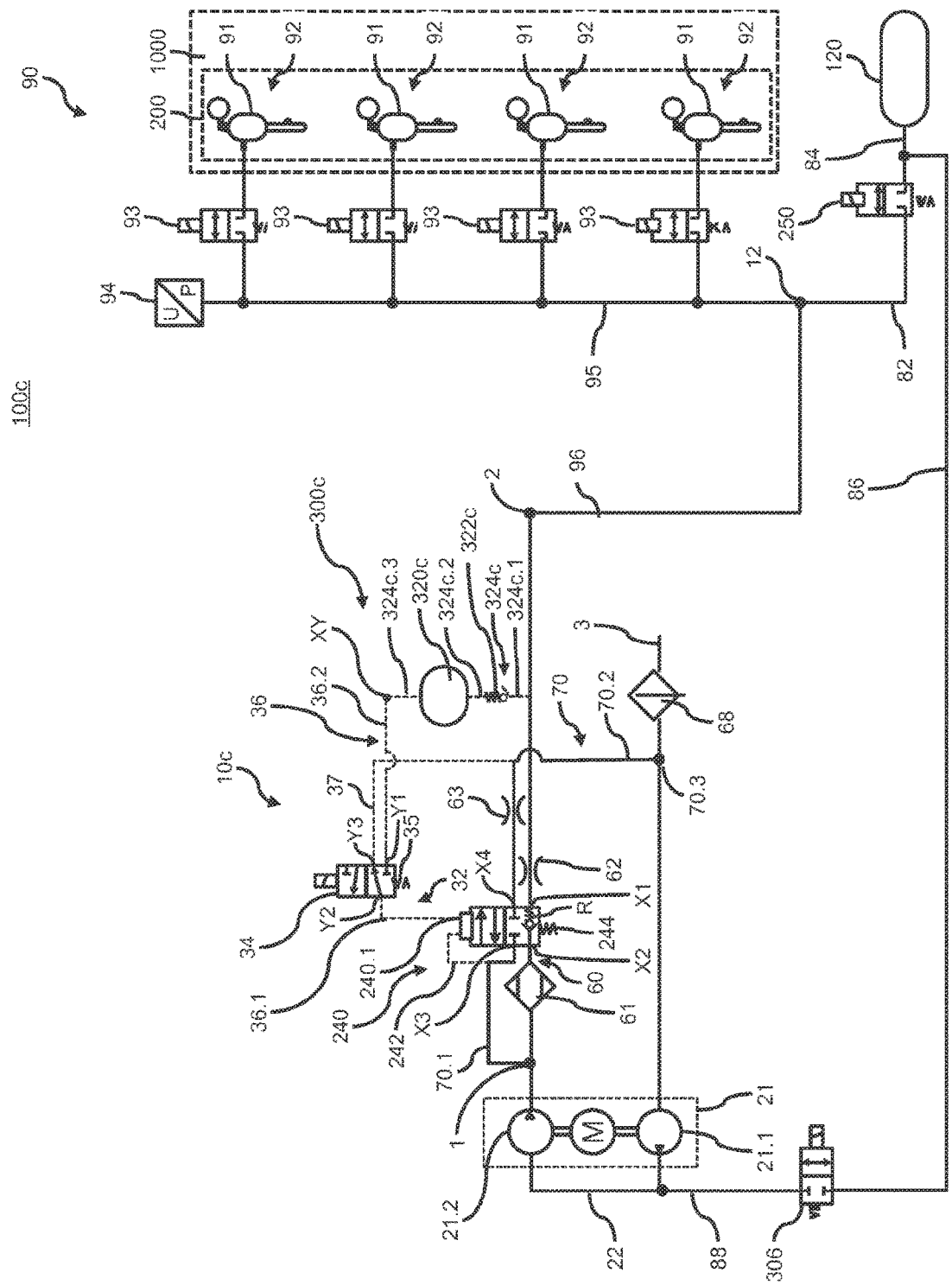
FIG. 3 shows a pneumatic system with a pressure-holding pneumatic reservoir device in a further preferred refinement, wherein a pilot pressure accumulator is connected to an accumulator connection on the pneumatic main line.

FIG. 3 shows a further, particularly preferred refinement of the invention. A pneumatic system 100c shown in FIG. 3 differs from the refinements shown in FIGS. 1 and 2 substantially in that the pilot pressure accumulator 320c of a pressure-holding reservoir device 300c is arranged such that it pneumatically connects the pneumatic main line 60 to the second part 36.2 of the control line 36. For this, the pilot pressure accumulator 320c is pneumatically connected to the pneumatic main line 60 via an accumulator connection 324c. Here, as in the refinement shown in FIGS. 1 and 2, the accumulator connection 324c comprises a pressure accumulator check valve 322c in order to allow the through-flow of the accumulator connection 324c only in one direction, namely from the pneumatic main line 60 to the pilot pressure accumulator 320c. For this, the pressure accumulator check valve 322c is arranged between a first part 324c.1 and a second part 324c.2 of the accumulator connection 324c. A third part 324c.3 of the accumulator connection 324c furthermore connects the pilot pressure accumulator 320c to the second part 36.2 of the control line 36 at a line port XY. In such a refinement, the pilot pressure accumulator 320c is filled when the pressure in the pneumatic main line 60 is higher than the counter-pressure of the pressure accumulator check valve 322c and/or than the pressure already prevailing in the pilot pressure accumulator 320c. The pressure accumulator check valve 320c advantageously achieves that the pressure in the pilot pressure accumulator 320c is maintained after filling, even if the pressure in the pneumatic main line 60 falls again. In particular in the embodiment of FIG. 3, the pressure is blocked and stored in the pilot pressure accumulator 320c between the check valve 322c and the pilot valve 34, port Y1; only after switching of the pilot valve 34 is a small quantity of the stored compressed air transferred to the pilot control port 240.1 of the pilot valve 240 in order to switch this. The pressure in the pilot pressure accumulator 320c thus corresponds to the previously highest pressure in the main line 60.

The higher pressure then present allows the active area of the pilot chamber or control chamber 246 to be designed smaller, without influencing the resulting opening force. For example, a doubling of the pilot pressure allows a reduction in active diameter to 70%. Furthermore, in this refinement the function of the pressure-holding reservoir device 300c is independent of the pressure accumulator 120 and in particular of the return line 86 and charging line 88.

Figure 4:
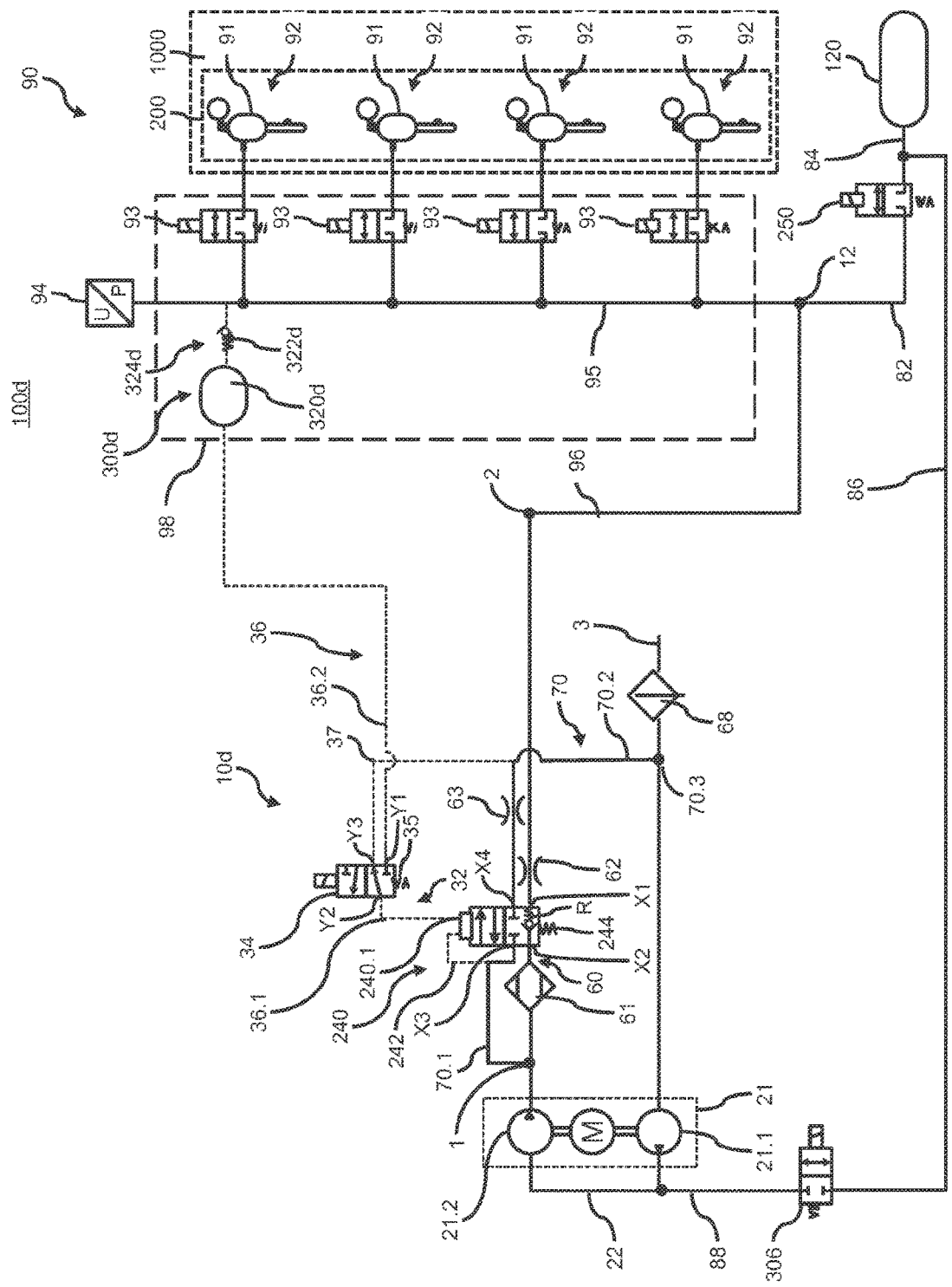
FIG. 4 shows a pneumatic system with a pressure-holding pneumatic reservoir device in a further preferred refinement, wherein a pilot pressure accumulator is connected to an accumulator connection on the gallery.

FIG. 4 shows a further preferred refinement of the invention, wherein a pilot pressure accumulator 320d is connected to an accumulator connection 324d on the gallery 95. The pressure accumulator is connected to the first pilot valve port Y1 of the pilot valve 34 via a second part 36.2 of a control line 36. In the same way as the refinement shown in FIG. 1 to FIG. 3, the present refinement also has a pressure accumulator check valve 322d in its accumulator connection 324d. Such a pressure accumulator check valve 322d ensures that the pilot pressure accumulator 320d is filled when the pressure in the gallery 95 is higher than the counter-pressure of the pressure accumulator check valve 322d and/or than the pressure already prevailing in the pilot pressure accumulator 320d. The pressure accumulator check valve 320d advantageously achieves that the pressure in the pilot pressure accumulator 320d is maintained after filling, even if the pressure in the gallery 95 falls again. In particular, in this refinement it is possible—although not necessary—to integrate the pilot pressure accumulator 320d and the accumulator connection 324d in a magnetic valve block 98, so that these form a structural unit with the directional control valves 93 and part of the gallery 95.

Figure 5B:
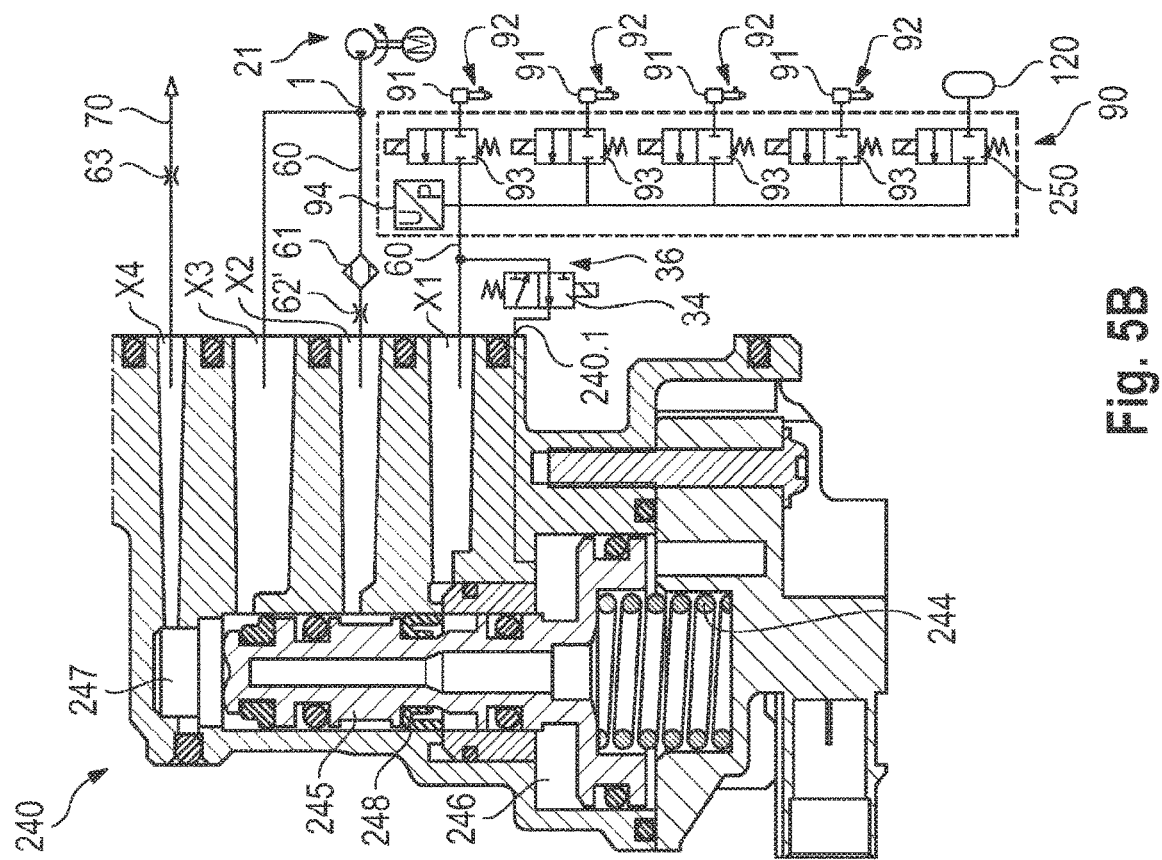
FIGS. 5A, 5B show sectional depictions of a vent valve in a delivery position and in a vent position respectively.
Figure 5A:
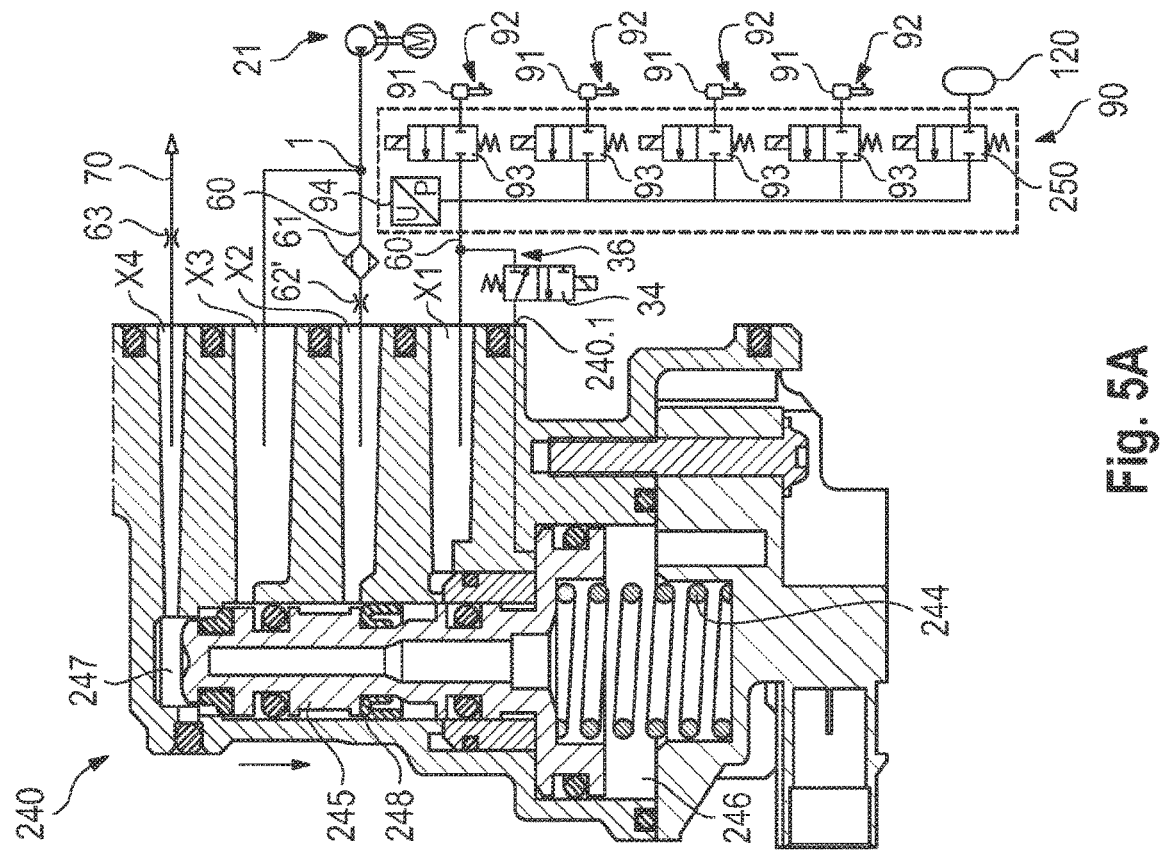

FIG. 5A shows a vent valve 240 in the delivery position, i.e. when a compressor 21 compresses air, in particular for use in a pneumatic system 90. For this, the air compressed by the compressor 21 is conducted via a pneumatic main line 60 and an air dryer 61 to the second pneumatic port X2. From there, the air enters the vent valve cylinder 247, where it flows past a vent valve piston 245 and in particular past a sealing ring 248 to the first pneumatic port X1. The arrangement of vent valve piston 245, the vent valve cylinder 247 and sealing ring 248 is such that air can flow from the second pneumatic port X2 to the first pneumatic port X1, but not in the opposite direction from the first pneumatic port X1 to the second pneumatic port X2. Thus this arrangement fulfils the function of a check valve. From there, the air travels on to the pneumatic main line 60 and finally—depicted very simply—to the pneumatic installation 90. In the present case, a branch to the control line 36 is arranged on the portion of the pneumatic main line 60 shown here between the first pneumatic port X1 and the pneumatic installation 90. The control line 36 creates a pneumatic connection between the pneumatic main line 60 and the pilot control port 240.1 of the vent valve 240, wherein this pneumatic connection may be selectively closed and interrupted by a pilot valve 34 which is arranged in the control line 36 and configured as a magnetic valve. For reasons of simplicity, FIGS. 5A and 5B do not show the pressure-holding pneumatic reservoir device according to the concept of the invention.

Advantageously, the lines leading to the ports X1 to X4 may be choked, as in the present case by a first choke 62' arranged in the line to the second pneumatic port X2 of the vent valve 240, and a second choke 63 arranged in the line to the fourth pneumatic port X4.

Furthermore, in the delivery position, the position of the vent valve piston 245 inside the vent valve cylinder 247 is such that the flow from a third pneumatic port X3 to a fourth pneumatic port X4 is blocked. In this way, the pneumatic connection between the compressed air supply 1 and the vent line 70 is interrupted.

FIG. 5B shows the vent valve 240 in a regeneration or vent position. In the regeneration/vent position, the pilot valve 34 is opened such that air can enter the pilot control port 240.1 and pass from there into a control chamber 246. The compressed air flowing into the control chamber 246 leads to the vent valve piston 245 moving downward against the return force of a vent valve spring 244. In this position of the vent valve piston 245, air can flow both from the first pneumatic port X1 to the second pneumatic port X2, and in the opposite direction from the second pneumatic port X2 to the first pneumatic port X1. At the same time, air can flow both from the third pneumatic port X3 to the fourth pneumatic port X4, and also in the opposite direction from the fourth pneumatic port X4 to the third pneumatic port X3.

Figure 6:
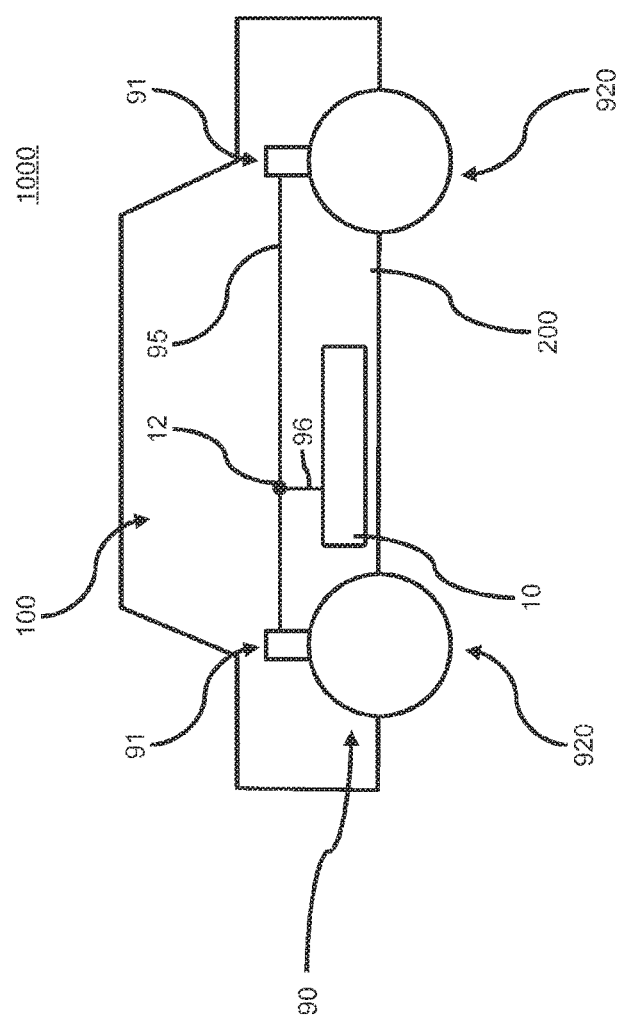
FIG. 6 shows a greatly simplified illustration of a vehicle with a pneumatic system.

FIG. 6 shows a diagrammatic depiction of a vehicle 1000, this case in the form of a car, with a vehicle superstructure 200 having a pneumatic system 100, with a compressed air supply system 10 and a pneumatic installation 90 configured as an air suspension system. In particular for vehicles in the car sector, the rapid provision of compressed air for ride height adjustment in operation is of great importance, since pauses, in particular for performance of an air pressure measurement, are perceptible to the driver of the vehicle. The car 1000 illustrated here as an example, without restriction of applicability also to trucks or other utility vehicles, has four wheels 920, of which—because of the sectional depiction—only the two wheels assigned to one vehicle side are shown. In the same way as the number of wheels, the air suspension system 90 has four air springs 92, of which—because of the sectional depiction (like the wheels)—only the two bellows assigned to one vehicle side are shown. The four air springs 92, which are assigned respectively to the four wheels 920, as part of the air suspension system 90, are supplied with compressed air by the compressed air supply system 10. The compressed air supply system 10 is connected fluid-conductively via the supply line 96, the main gallery port 12 and the gallery 95, to the components of the pneumatic installation 90, in this case the four air springs 92.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE DESIGNATIONS

1 Compressed air supply
2 Compressed air port
3 Vent port
10, 10a— d Compressed air supply system
12 Main gallery port
21 Compressor arrangement, compressor
21.1 Low-pressure stage
21.2 High-pressure stage
22 Intermediate line
32 Pilot control channel
34 Pilot valve
35 Control valve spring
36 Control line
36.1 First part of control line
36.2 Second part of control line
36.3 Third part of control line
36.4 Fourth part of control line
37 Control vent line
60 Pneumatic main line
61 Air dryer
62, 62' First choke
63 Second choke
68 Air filter
70 Vent line
70.1 First part of vent line
70.2 Second part of vent line
70.3 Connection point
82 Pressure accumulator supply line
84 Accumulator line
86 Return line
88 Charging line
90 Air suspension installation, pneumatic installation
91 Spring bellows, bellows
92 Air spring
93 Directional control valve
94 Pressure sensor
95 Gallery
96 Supply line
98 Magnetic valve block
100, 100a— d Pneumatic system
120 Pressure accumulator
200 Vehicle superstructure
240 Vent valve
240.1 Pilot control port of vent valve
242 Second pilot control port of vent valve
244 Vent valve spring
245 Vent valve piston
246 Control chamber
247 Vent valve cylinder
248 Sealing ring
250 Pressure accumulator valve
300, 300a— d Pressure-holding pneumatic reservoir device
304 Branch point
306 Charging valve
320a— d Pilot pressure accumulator, second pressure accumulator
322 Pressure accumulator valve
322a— d Pressure accumulator check valve
324a— d Accumulator connection
324c.1-324c.3 First to third parts of accumulator connection
400 Device for controlling and regulating the pneumatic system
920 Wheel
1000 Vehicle
M Motor
R Check valve of vent valve
X1 First pneumatic port of vent valve
X2 Second pneumatic port of vent valve
X3 Third pneumatic port of vent valve
X4 Fourth pneumatic port of vent valve
XY Line connection
Y1 First pilot valve port
Y2 Second pilot valve port
Y3 Third pilot valve port

The invention claimed is:

1. A compressed air supply system for operating a pneumatic installation of a vehicle, the pneumatic installation including at least one air spring, the compressed air supply system comprising:
    a compressed air supply connected to a compressor having at least one compressor stage;
    a compressed air port to the pneumatic installation;
    a vent port to a venting environment;
    a pneumatic main line between the compressed air supply and the compressed air port, the pneumatic main line including an air dryer;
    a vent valve arranged in the pneumatic main line and configured to vent the pneumatic installation via the pneumatic main line, the vent valve having a pilot control port;
    a solenoid valve and a pneumatic pilot control channel which pneumatically connects the solenoid valve to the pilot control port of the vent valve; and
    a pilot pressure accumulator configured to be pneumatically connected to the pilot control port of the vent valve via a control line, wherein the pilot pressure accumulator is configured to provide, during venting of the pneumatic installation and independently of a pressure in the pneumatic main line, a control pressure to the pilot control port of the vent valve via the control line.

2. The compressed air supply system as claimed in claim 1, wherein the pilot pressure accumulator is configured to be pneumatically connected to the pneumatic main line via an accumulator line separate from the control line.

3. The compressed air supply system as claimed in claim 2, wherein a pressure accumulator check valve, configured to open in a direction of the pilot pressure accumulator and to block flow in an opposite direction, is arranged in the accumulator line.

4. The compressed air supply system as claimed in claim 3, wherein the pilot pressure accumulator is fully or partly integrated in a magnetic valve block.

5. The compressed air supply system as claimed in claim 1, wherein the pilot pressure accumulator is configured to be pneumatically connected to a pressure accumulator via an accumulator line separate from the control line.

6. The compressed air supply system as claimed in claim 5, wherein the pressure accumulator directly supplies fluid to the pilot pressure accumulator via a check valve in the accumulator line.

7. The compressed air supply system as claimed in claim 1, wherein the pilot pressure accumulator is configured to be pneumatically connected to a gallery via an accumulator line separate from the control line.

8. The compressed air supply system as claimed in claim 1, wherein the pilot pressure accumulator is fully or partly integrated in the compressed air supply system.

9. A vehicle with a compressed air supply system as claimed in claim 1.

10. The compressed air supply system as claimed in claim 1, wherein the control line comprises a direct and exclusive pneumatic connection between the pilot pressure accumulator and the solenoid valve.

11. A method for operating a compressed air supply system, wherein the compressed air supply system is configured to operate a pneumatic installation in a vehicle, the pneumatic installation including at least one air spring, and has a pilot pressure accumulator, the method comprising:

compressing air to form compressed air;

supplying, via a pneumatic main line, the pneumatic installation and/or a pressure accumulator and/or a gallery with the compressed air;

filling the pilot pressure accumulator with the compressed air;

operating the pneumatic installation with the compressed air; and venting the pneumatic installation via a vent valve configured as a pilot pressure actuated valve and having a pilot control port, wherein the pilot pressure accumulator is connected to the pilot control port and holds, during venting of the pneumatic installation and independently of a pressure in the pneumatic main line, the pilot control port under control pressure, and wherein the pilot pressure accumulator is pneumatically connected to the pilot control port via a control line for actuation of the vent valve.

12. The method as claimed in claim 11, wherein the pilot pressure accumulator is filled autonomously.

13. The method as claimed in claim 11, wherein the pilot pressure accumulator is filled via the pneumatic main line and/or the pressure accumulator and/or the gallery.

* * * * *